US011636682B2

(12) United States Patent
Kwatra et al.

(10) Patent No.: US 11,636,682 B2
(45) Date of Patent: Apr. 25, 2023

(54) EMBEDDING CONTEXTUAL INFORMATION IN AN IMAGE TO ASSIST UNDERSTANDING

(71) Applicant: International Business Machines Corporation, Armonk, NY (US)

(72) Inventors: Shikhar Kwatra, San Jose, CA (US); Mauro Marzorati, Lutz, FL (US); Aaron K. Baughman, Cary, NC (US); Kimberly Greene Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 17/089,979

(22) Filed: Nov. 5, 2020

(65) Prior Publication Data

US 2022/0138473 A1    May 5, 2022

(51) Int. Cl.
G06V 20/40    (2022.01)
G06K 9/62    (2022.01)
G06N 3/04    (2006.01)

(52) U.S. Cl.
CPC ........... *G06V 20/46* (2022.01); *G06K 9/6223* (2013.01); *G06K 9/6232* (2013.01);
(Continued)

(58) Field of Classification Search
CPC ........... H04N 21/23424; H04N 1/6052; G06N 3/0454; G06N 3/088; G06N 10/00; G06V 10/82
See application file for complete search history.

(56) References Cited

U.S. PATENT DOCUMENTS

| 6,678,332 B1 | 1/2004 | Gardere et al. |
| 7,529,411 B2 | 5/2009 | Haupt et al. |

(Continued)

FOREIGN PATENT DOCUMENTS

| WO | 2019177951 A1 | 9/2019 |
| WO | 2020111426 A1 | 6/2020 |

OTHER PUBLICATIONS

Liu et al., "Simulating the Ising Model with a Deep Convollutoinal Generative Adversarial Network," https://arxiv.org/pdf/1710.04987.pdf, Oct. 2017, pp. 1-7.

(Continued)

*Primary Examiner* — Ross Varndell
(74) *Attorney, Agent, or Firm* — Robert A. Voigt, Jr.; Shackelford, Bowen, McKinley & Norton, LLP

(57) ABSTRACT

A computer-implemented method, system and computer program product for embedding contextual information in an image or video frames. A generative adversarial network (GAN) is trained to provide contextual information to be embedded in an image or video frames, where the contextual information includes text, sound and/or video frames that provides context to the image or video frames. After training the GAN, an image or video frames are received to be embedded with contextual information if necessary. Features are then extracted from the received image/video frames. An image(s) or video frame(s) are identified in a database using the GAN associated with features with a similarity to the extracted features of the received image/video frames that exceeds a threshold value. Such identified images and/or video frames are associated with "references" containing contextual information which are extracted. The received image/video frames are then augmented with the extracted references to provide context.

20 Claims, 6 Drawing Sheets

(52) U.S. Cl.
CPC ............ *G06K 9/6256* (2013.01); *G06N 3/04* (2013.01); *G06V 20/41* (2022.01); *G06V 20/49* (2022.01)

(56) References Cited

U.S. PATENT DOCUMENTS

| | | |
|---|---|---|
| 7,720,851 B2 | 5/2010 | Chang et al. |
| 7,782,365 B2 | 8/2010 | Levien et al. |
| 9,594,960 B2 | 3/2017 | Ofek et al. |
| 10,185,468 B2 | 1/2019 | Schneider, IV et al. |
| 10,726,289 B2 | 7/2020 | Kim et al. |
| 2009/0148058 A1 | 6/2009 | Gokce et al. |
| 2020/0193272 A1* | 6/2020 | Chudak ................ G06N 3/0454 |
| 2020/0228880 A1* | 7/2020 | Iyer ................. H04N 21/23424 |
| 2021/0158570 A1* | 5/2021 | Mohandoss .......... H04N 1/6052 |

OTHER PUBLICATIONS

Edward Hyatt, "Birthday Gift What is a GIF, Who Invented the Image Format, How is it Pronounced and What's an Animated Meme?" https://www.thesun.co.uk/tech/3800248/what-is-gif-how-pronounced-animated-memes/#, Jun. 15, 2017, pp. 1-6.

Inel et al., "A Study of Narrative Creation by Means of Crowds and Niches," Sixth AAAI Conference on Human Computation and Crowdsourcing (HCOMP 2018), Zurich, Switzerland, Jul. 5-8, 2018, pp. 1-4.

* cited by examiner

EMBEDDING CONTEXTUAL INFORMATION IN AN IMAGE TO ASSIST UNDERSTANDING

TECHNICAL FIELD

The present disclosure relates generally to video content analysis, and more particularly to embedding contextual information (e.g., text, sound and/or video frames) in an image (e.g., single video frame), video clip or video stream to assist in understanding the meaning of the image, video clip or video stream.

BACKGROUND

At times, when individuals exchange communications, such as electronic mail, the sender may include images or video clips in the message with the intention of making the recipient laugh. However, the recipient may not understand the intended meaning of the inserted image or video clip, and therefore, not be able to understand the humor.

For example, the sender may insert a short video clip of a movie in an electronic message to the recipient with the intention of making the recipient laugh. Using editing tools, such as video editing tools, the sender may insert a tagline, text or phrase next to the video clip with an intended humorous meaning. However, understanding the intended humor may depend on having knowledge of a particular movie or the features of a product to which the video clip and inserted tagline, text or phrase pertains. If the recipient does not possess knowledge of such a movie or features of the product, then the recipient may not understand the intended humor.

SUMMARY

In one embodiment of the present disclosure, a computer-implemented method for embedding contextual information in an image or video frames comprises training a generative adversarial network to provide contextual information to be embedded in the image or the video frames, where the contextual information comprises text, sound and/or video frames that provides context to the image or the video frames. The method further comprises receiving the image or the video frames. The method additionally comprises extracting features from the received image or the video frames, where the extracted features comprise topics, events as well as sites and objects. Furthermore, the method comprises identifying one or more images and/or one or more video frames in a database using the generative adversarial network associated with features with a similarity to the extracted features from the received image or the video frames that exceeds a threshold value. Additionally, the method comprises extracting references containing contextual information associated with the identified one or more images and/or one or more video frames in the database. In addition, the method comprises augmenting the image or the video frames with the extracted references.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
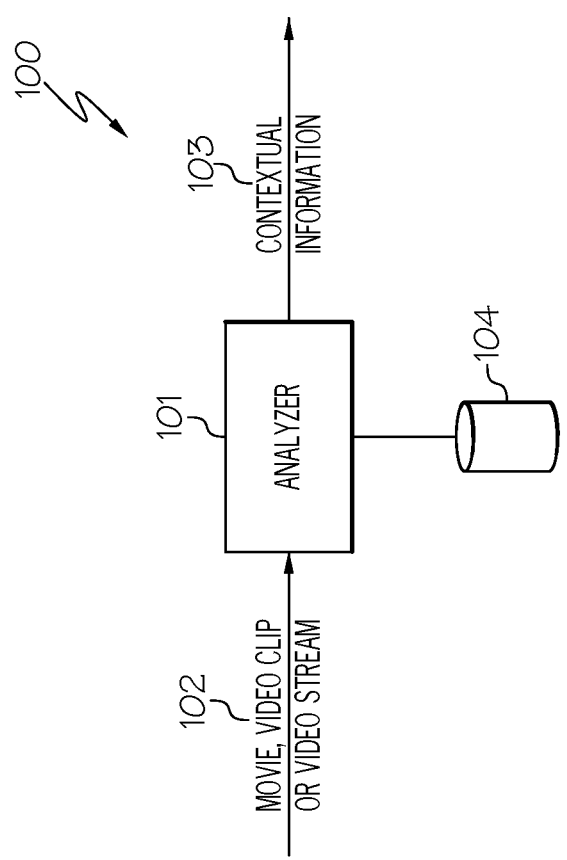
FIG. 1 illustrates a communication system for practicing the principles of the present disclosure in accordance with an embodiment of the present disclosure.

As stated in the Background section, at times, when individuals exchange communications, such as electronic mail, the sender may include images or video clips in the message with the intention of making the recipient laugh. However, the recipient may not understand the intended meaning of the inserted image or video clip, and therefore, not be able to understand the humor.

For example, the sender may insert a short video clip of a movie in an electronic message to the recipient with the intention of making the recipient laugh. Using editing tools, such as video editing tools, the sender may insert a tagline, text or phrase next to the video clip with an intended humorous meaning. However, understanding the intended humor may depend on having knowledge of a particular movie or the features of a product to which the video clip and inserted tagline, text or phrase pertains. If the recipient does not possess knowledge of such a movie or features of the product, then the recipient may not understand the intended humor.

Currently, such editing tools do not possess the capability or intelligence to automatically embed contextual information in an image, video clip or video stream that would be necessary for the recipient to have in order to understand the intended humor.

The embodiments of the present disclosure provide a means for utilizing a generative adversarial network to provide contextual information, including text, sound and/or video frames, to be embedded in an image, video clip or video stream to improve understanding of the image, video clip or video stream.

In some embodiments of the present disclosure, the present disclosure comprises a computer-implemented method, system and computer program product for embedding contextual information in an image or video frames. In one embodiment of the present disclosure, a generative adversarial network is trained to provide contextual information to be embedded in the image or the video frames, where the contextual information includes text, sound and/or video frames that provides context to the image or the video frames. After training the generative adversarial network, an image or video frames are received to be embedded with contextual information if necessary. Contextual information, as used herein, refers to information, including text, sound and/or video frames, that provides context to an image, video clip or video stream. Such context enables understanding of the image, video clip or video stream. Features are then extracted from the received image or video frames, where the extracted features include topics, events as well as sites and objects. One or more images and/or one or more video frames are identified in a database using the generative adversarial network that are associated with features with a similarity to the extracted features of the received image or video frames that exceeds a threshold value. Such identified images and/or video frames are associated with "references" containing contextual information. As a result, references containing contextual information associated with the identified one or more images and/or one or more video frames are extracted from the database. The received image or video frames are then augmented with the extracted references to provide context to the received image and/or video frames thereby improving understanding of the image and/or video frames.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates a communication system 100 for embedding contextual information, including text, sound and/or video frames, in an image, video clip or video stream to improve understanding of the image, video clip or video stream. Referring to FIG. 1, communication system 100 includes an analyzer 101 configured to apply a generative adversarial network (GAN) to a received image, video clip or video stream 102 to output contextual information 103, such as text, sound and/or video frames, that is to be embedded in the received image, video clip or video stream 102 to aid in understanding the meaning of the image, video clip or video stream, such as the intended humor of the image, video clip or video stream.

"Contextual information," as used herein, refers to information, including text, sound and/or video frames, that provides context to an image, video clip or video stream. Such context enables understanding of the image, video clip or video stream. For example, suppose that a user sends an electronic message to a recipient with a video clip from an episode of the television show Seinfeld to evoke humor. If the recipient had never seen the television show Seinfeld or the specific video clip, then the recipient may not understand the humor of the video clip. As a result, contextual information may be generated by the generative adversarial network, such as text, additional video clips from this television episode and/or sound from this television episode, to assist the recipient in understanding the humor of the video clip.

In one embodiment, communication system 100 further includes a database 104 connected to analyzer 101 storing images and/or video frames associated with extracted topics, events as well as sites and objects. Furthermore, such images and/or video frames are associated with references that include aural, textual and visual cues regarding the topics, events as well as the sites and objects that are associated with the stored images and/or video frames. For example, references, such as the sound of an engine revving up, the text of a car chase and a video of a car chase may be associated with the images and/or video frames of a scene of a car chase in a movie in which the bad guys are being chased by law enforcement.

A discussion regarding the hardware configuration of analyzer 101 is provided below in connection with FIG. 2.

Figure 2:
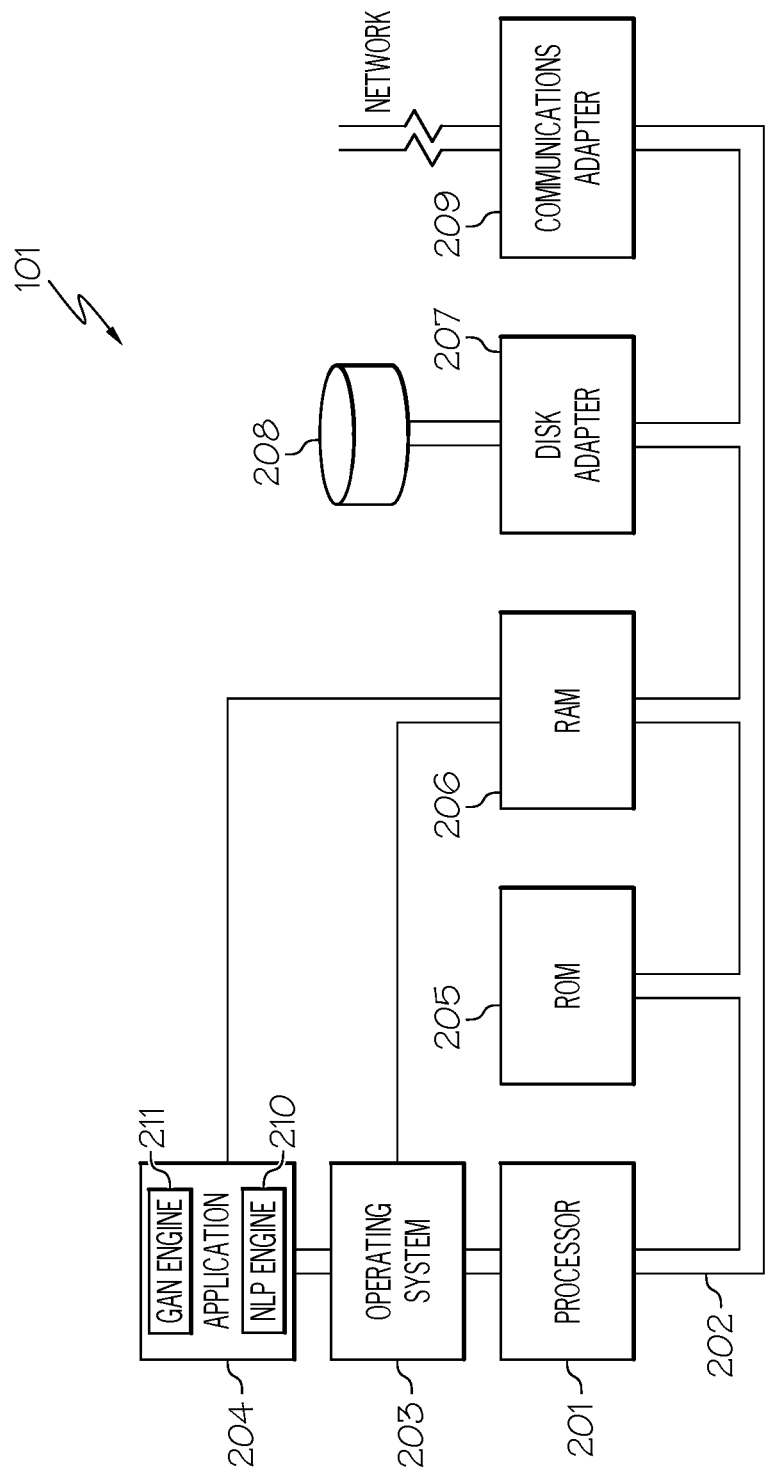
FIG. 2 illustrates an embodiment of the present disclosure of a hardware configuration of the analyzer.

Referring now to FIG. 2, FIG. 2 illustrates an embodiment of the present disclosure of the hardware configuration of analyzer 101 (FIG. 1) which is representative of a hardware environment for practicing the present disclosure.

Analyzer 101 has a processor 201 connected to various other components by system bus 202. An operating system 203 runs on processor 201 and provides control and coordinates the functions of the various components of FIG. 2. An application 204 in accordance with the principles of the present disclosure runs in conjunction with operating system 203 and provides calls to operating system 203 where the calls implement the various functions or services to be performed by application 204. Application 204 may include, for example, a program for embedding contextual information, including text, sound and/or video frames, in an image, video clip or video stream to improve understanding of the image, video clip or video stream as discussed further below in connection with FIGS. 3-6.

Referring again to FIG. 2, read-only memory ("ROM") 205 is connected to system bus 202 and includes a basic input/output system ("BIOS") that controls certain basic functions of analyzer 101. Random access memory ("RAM") 206 and disk adapter 207 are also connected to system bus 202. It should be noted that software components including operating system 203 and application 204 may be loaded into RAM 206, which may be analyzer's 101 main memory for execution. Disk adapter 207 may be an integrated drive electronics ("IDE") adapter that communicates with a disk unit 208, e.g., disk drive. It is noted that the program for embedding contextual information, including text, sound and/or video frames, in an image, video clip or video stream to improve understanding of the image, video clip or video stream, as discussed further below in connection with FIGS. 3-6, may reside in disk unit 208 or in application 204.

Analyzer 101 may further include a communications adapter 209 connected to bus 202. Communications adapter 209 interconnects bus 202 with an outside network to communicate with other devices.

In one embodiment, application 204 of analyzer 101 includes a natural language processing (NLP) engine 210 configured to perform natural language processing as discussed herein. Furthermore, in one embodiment, application 204 of analyzer 101 includes a generative adversarial network (GAN) engine 211 configured to train a GAN to provide contextual information to be embedded in an image, video clip or video stream. In one embodiment, such components may be implemented in hardware, where such hardware components would be connected to bus 202. The functions of such components are not generic computer functions. As a result, analyzer 101 is a particular machine that is the result of implementing specific, non-generic computer functions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, at times, when individuals exchange communications, such as electronic mail, the sender may include images or video clips in the message with the intention of making the recipient laugh. However, the recipient may not understand the intended meaning of the inserted image or video clip, and therefore, not be able to understand the humor. For example, the sender may insert a short video clip of a movie in an electronic message to the recipient with the intention of making the recipient laugh. Using editing tools, such as video editing tools, the sender may insert a tagline, text or phrase next to the video clip with an intended humorous meaning. However, understanding the intended humor may depend on having knowledge of a particular movie or the features of a product to which the video clip and inserted tagline, text or phrase pertains. If the recipient does not possess knowledge of such a movie or features of the product, then the recipient may not understand the intended humor. Currently, such editing tools do not possess the capability or intelligence to automatically embed contextual information in an image, video clip or video stream that would be necessary for the recipient to have in order to understand the intended humor.

Figure 3:
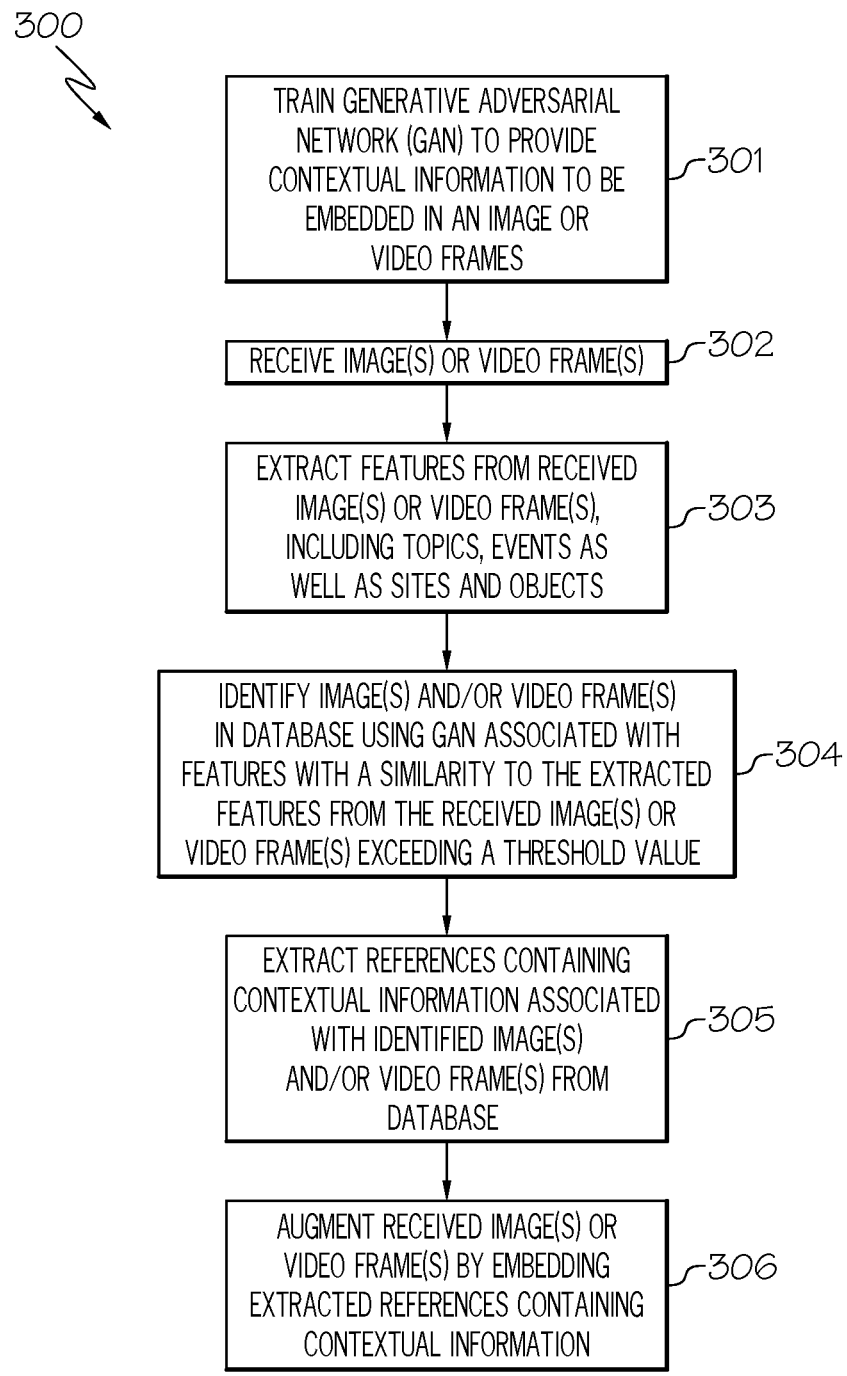
FIG. 3 is a flowchart of a method for embedding an image, video clip or video stream with contextual information to aid in understanding the image, video clip or video stream, such as understanding the intended humor, in accordance with an embodiment of the present disclosure.
Figure 4:
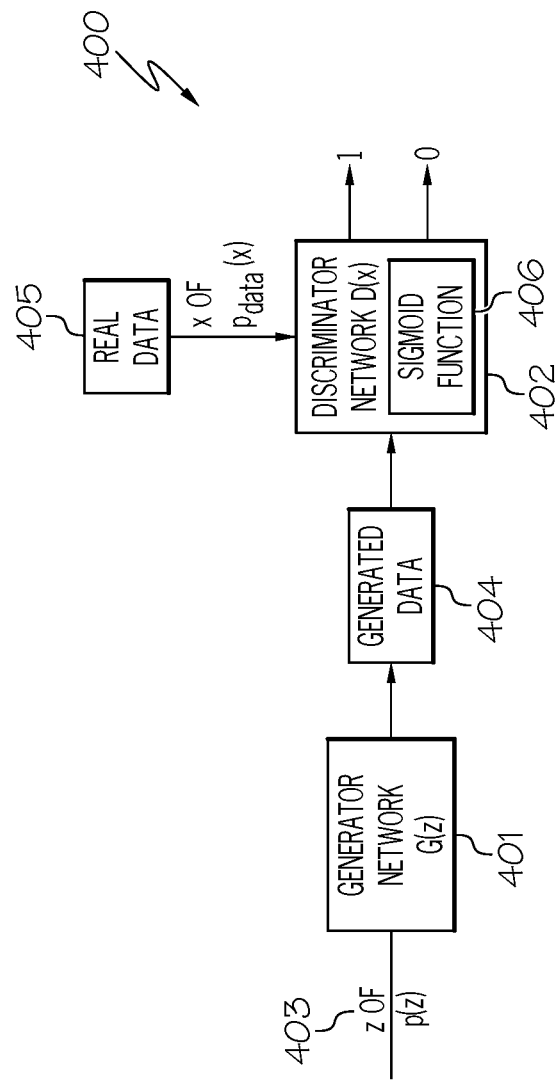
FIG. 4 illustrates an architecture of the generative adversarial network (GAN) in accordance with an embodiment of the present disclosure.
Figure 5:
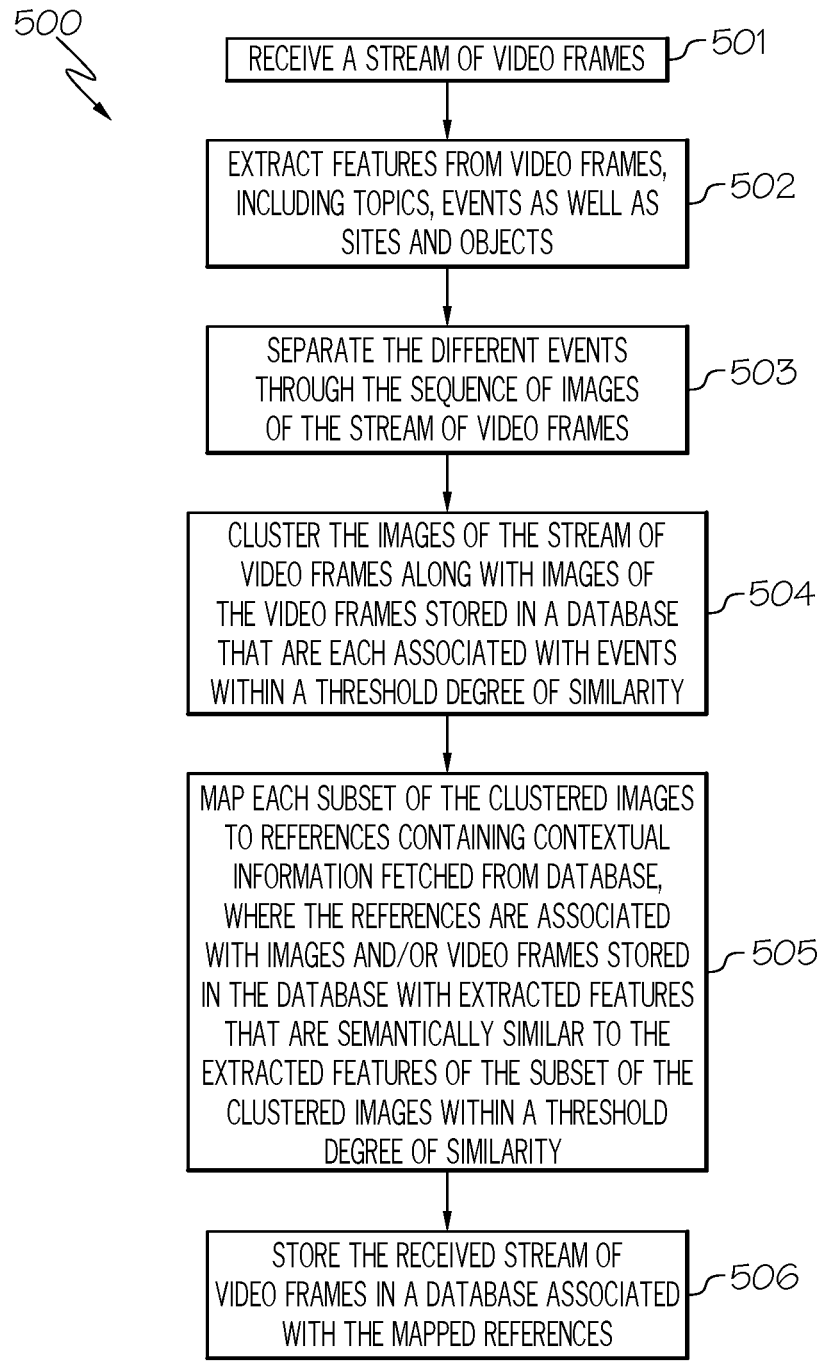
FIG. 5 is a flowchart of a method for generating contextual information to be embedded in an image, video clip or video stream in accordance with an embodiment of the present disclosure.
Figure 6:
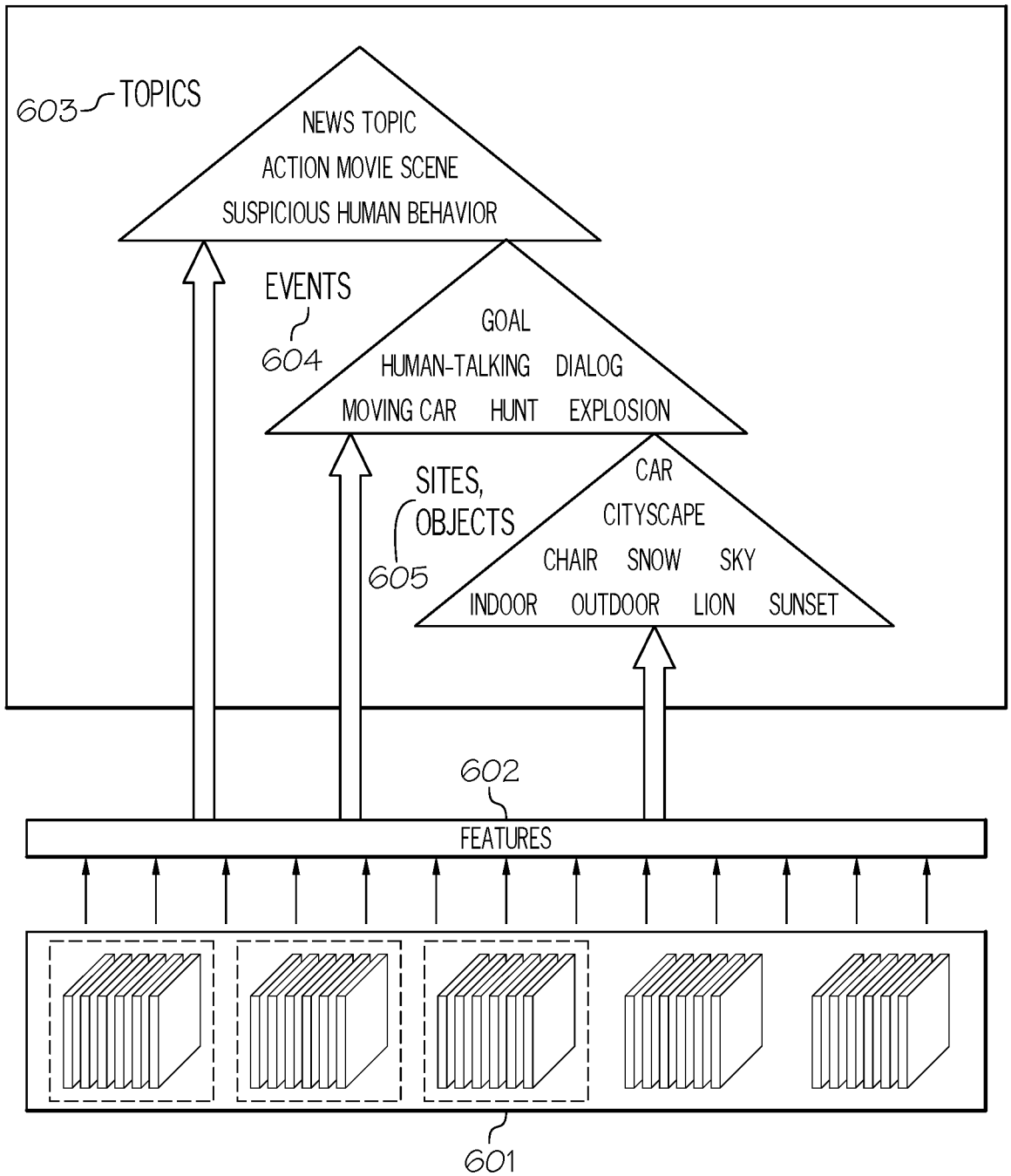
FIG. 6 illustrates extracting information from a stream of video frames in accordance with an embodiment of the present disclosure.

The embodiments of the present disclosure provide a means for utilizing a generative adversarial network to provide contextual information, including text, sound and/or video frames, to be embedded in an image, video clip or video stream to improve understanding of the image, video clip or video stream as discussed below in connection with FIGS. 3-6. FIG. 3 is a flowchart of a method for embedding an image, video clip or video stream with contextual information to aid in understanding the image, video clip or video stream, such as understanding the intended humor. FIG. 4 illustrates an architecture of the generative adversarial network (GAN). FIG. 5 is a flowchart of a method for providing contextual information to be embedded in an image, video clip or video stream. FIG. 6 illustrates extracting information from a stream of video frames.

As stated above, FIG. 3 is a flowchart 300 for embedding an image, video clip or video stream with contextual information to aid in understanding the image, video clip or video stream, such as understanding the intended humor, in accordance with an embodiment of the present disclosure.

Referring to FIG. 3, in conjunction with FIGS. 1-2, in step 301, analyzer 101 trains a generative adversarial network (GAN) to provide contextual information to be embedded in an image (e.g., single video frame) or video frames (e.g., video clip, video stream), such as via GAN engine 211.

In one embodiment, in order to train a GAN, a problem first needs to be defined, such as the problem of providing contextual information, such as text, sound and images (e.g., single video frame, video clip, video stream).

Furthermore, in one embodiment, the architecture of the GAN needs to be defined as shown in FIG. 4. FIG. 4 illustrates an architecture 400 of the generative adversarial network (GAN) in accordance with an embodiment of the present disclosure. Referring to FIG. 4, the architecture 400 of the GAN includes a generator network 401 (also referred to herein as simply "generator") and a discriminator network 402 (also referred to herein as simply "discriminator").

In one embodiment, generator network 401 takes a random input (z) 403 and tries to generate a sample of data (generated data 404). For example, as shown in FIG. 4, generator G(z) of generator network 401 takes an input z from p(z), where z is a sample from the probability distribution p(z), where p(z) is the distribution of generator 401. Generator network 401 then generates data 404 which is inputted into discriminator network D(x) 402. The task of discriminator network 402 is to take input either from real data x 405 or from generator 401 and try to predict whether the input is real or generated. For example, as shown in FIG. 4, discriminator network 402 receives an input x from $p_{data}(x)$, where $p_{data}(x)$ is the distribution of real data. In one embodiment, discriminator network 402 then solves a binary classification problem using a sigmoid function 406, which provides an output in the range from 0 to 1.

In one embodiment, the training of the GAN is performed as a contest between generator network 401 and discriminator network 402. This can be represented mathematically as $$\min_G \min_D V(D, G)$$
$$V(D, G) = \mathbb{E}_{x \sim p_{data}(x)}[\log D(x)] + \mathbb{E}_{z \sim p_z(z)}[\log(1 - D(G(z)))]$$

In the function V(D, G), the first term is entropy that the data from real distribution ($p_{data}(x)$) passes through discriminator 402 (i.e., best case scenario). Discriminator 402 then tries to maximize this to 1. The second term is entropy that the data from random input (p(z)) passes through generator 401, which then generates a fake sample which is then passed through discriminator 402 to identify the fakeness (i.e., worst case scenario). In this term, discriminator 402 tries to maximize it to 0 (i.e., the log probability that the data from generator 401 is fake is equal to 0). So overall, discriminator 402 is attempting to maximize function V. On the other hand, the task of generator 401 is the opposite, i.e., tries to minimize the function V so that the differentiation between real and fake data is a bare minimum.

Furthermore, in one embodiment, in order to train the GAN, discriminator 402 is trained on real data for n epochs so that discriminator 402 correctly predicts them as real. In one embodiment, n may be any natural number between 1 and infinity.

Additionally, in one embodiment, in order to train the GAN, generator 401 needs to generate fake data, which is used to train discriminator 402 so that discriminator 402 correctly predicts them as fake.

In one embodiment, when discriminator 402 is trained, its predictions are used as an objective for training generator 401. Generator 401 is then trained to fool discriminator 402. These steps of training discriminator 402 and generator 401 are repeated for a few epochs. After evaluating whether the GAN is performing well enough, such training may be suspended.

In one embodiment, generator and discriminator networks 401, 402 are convolutional neural networks.

A more detailed discussion regarding training generative adversarial network (GAN), such as via GAN engine 211, to provide contextual information to be embedded in an image, video clip or video stream is provided below in connection with FIG. 5.

FIG. 5 is a flowchart of a method 500 for providing contextual information to be embedded in an image, video clip or video stream in accordance with an embodiment of the present disclosure.

Referring to FIG. 5, in conjunction with FIGS. 1-4, in step 501, analyzer 101 receives a stream of video frames, such as from a video frame buffer. While the following discusses training the GAN using a stream of video frames, the GAN may also be trained using other types of data, such as sound tracks, texts from documents, etc.

In step 502, analyzer 101 extracts the features from the video frames, including topics, events as well as the sites and objects as shown in FIG. 6.

FIG. 6 illustrates extracting information from a stream of video frames in accordance with an embodiment of the present disclosure.

Referring to FIG. 6, in conjunction with FIGS. 1-5, as shown in FIG. 6, features 602 of video frames 601 are extracted by analyzer 101 and classified or categorized into topics 603 (e.g., action movie scene, suspicious human behavior, news topic T), events 604 (e.g., goal, human-talking, dialog, moving car, hunt, explosion), and sites, objects 605 (e.g., car, cityscape, chair, snow, sky, indoor, lion, sunset, outdoor).

In one embodiment, topics 603, as used herein, refer to the subject or main idea/thought of the analyzed video frames. In one embodiment, topics 603 may be identified via a video metadata extraction algorithm. For example, metadata may be embedded within the video files. Such metadata may include information about the video, such as the title, description, publishing time, etc. that puts the video file into a context and enhances its presentation. Examples of such metadata extraction tools include the metadata extraction tool developed by the National Library of New Zealand, Metadata2Go, metadata-extractor by GitHub, etc. Such extracted metadata may be utilized to identify topics using natural language processing, such as via NLP engine 210. For example, in one embodiment, a topic model (type of statistical model) may be utilized for discovering the topics in the extracted metadata, where the topic model includes words that are commonly associated with a topic. Such words identified from the extracted metadata may be utilized to identify the topic most associated with the extracted metadata. For example, if the extracted metadata includes the description of a scene of a car jumping over railroad tracks, then terms, such as car, jumping and railroad track may be associated with the topic of a movie action scene in a topic model.

In one embodiment, events 604, as used herein, refer to the noteworthy happenings occurring in the analyzed video frames, including the audio-visual content. In one embodiment, events 604 are identified via a video metadata extraction algorithm as previously discussed. Such extracted metadata may include the title, description, publishing time, etc. Such information may be utilized by analyzer 101 to identify the events using natural language processing, such as via NLP engine 210. For example, in one embodiment, an event model (type of statistical model) may be utilized for discovering the events in the extracted metadata, where the event model includes description words that are commonly associated with an event. Such words identified from the extracted metadata may be utilized to identify the event most associated with the extracted metadata. For example, if the extracted metadata includes the description of a scene of a car in a car chase, then terms, such as car and chase, may be associated with the event of a moving car in the event model.

In one embodiment, sites and objects 605, as used herein, refer to the scene objects, such as snow, sunset, the sky, etc. In one embodiment, sites and objects 605 are identified via a video metadata extraction algorithm as previously discussed. Such extracted metadata may include the title, description, publishing time, etc. Such information may be utilized by analyzer 101 to identify the sites and objects using natural language processing, such as via NLP engine 210. For example, in one embodiment, a sites and objects model (type of statistical model) may be utilized for discovering the sites and objects in the extracted metadata, where the sites and objects model includes description words that are commonly associated with the sites and objects. Such words identified form the extracted metadata may be utilized to identify the sites and objects most associated with the extracted metadata. For example, if the extracted metadata includes the description of a scene of the sun setting, then terms, such as sun and setting, may be associated with the scene of a sunset.

Returning to FIG. 5, in conjunction with FIGS. 1-4 and 6, in step 503, analyzer 101 separates the different events (from the extracted features) through the sequence of images of the stream of video frames. For example, in one embodiment, the extracted events among the received stream of video frames are separated from one another based on the type of event using natural language processing, such as via NLP engine 210. For instance, an event directed to a moving car event is separated from an event directed to an explosion as the terms "moving car" and "explosion" elicit a different meaning as determined using natural language processing. In one embodiment, such events are further separated from one another based on its publishing time that was identified from the extracted metadata. As a result, the extracted events may be further separated in terms of the publishing time, where the events are arranged in order from the earliest occurring event to the latest occurring event.

In step 504, analyzer 101 clusters the images of the stream of video frames along with images of the video frames stored in database 104 that are each associated with events within a threshold degree of similarity. For example, images of the video frames will be clustered with the video frames stored in database 104 that are associated with similarly defined events within a threshold of similarity (which may be user-selected). In one embodiment, similarity is based on how close is the semantic meaning of the events associated with the stored video frames to the semantic meaning of the events associated with the analyzed images of the video frames of step 501. In one embodiment, such a semantic meaning is determined using natural language processing.

In one embodiment, semantic similarity is a metric defined over a set of terms, where the idea of distance between items is based on the likeness of their meaning or semantic content as opposed to lexicographical similarity. In one embodiment, mathematical tools are used to estimate the strength of the semantic relationship between units of language, concepts or instances, through a numerical description obtained according to the comparison of information supporting their meaning or describing their nature.

In one embodiment, computationally, semantic similarity can be estimated by defining a topological similarity, by using ontologies to define the distance between terms/concepts. For example, a naive metric for the comparison of concepts ordered in a partially ordered set and represented as nodes of a directed acyclic graph (e.g., a taxonomy), would be the shortest-path linking the two concept nodes. Based on text analyses, semantic relatedness between units of language (e.g., words) can also be estimated using statistical means, such as a vector space model to correlate words and textual contexts from a suitable text corpus. The evaluation of the proposed semantic similarity/relatedness measures are evaluated through two main ways. The former is based on the use of datasets designed by experts and composed of word pairs with semantic similarity/relatedness degree estimation. The second way is based on the integration of the measures inside specific applications, such as natural language processing.

In one embodiment, the approaches to calculate topological similarity between ontological concepts include edge-based (use the edges and their types as the data source) and node-based (main data sources are the nodes and their properties). Other measures calculate the similarity between ontological instances, such as pairwise (measure functional similarity between two instances by combining the semantic similarities of the concepts they represent) and groupwise (calculate the similarity directly and not combining the semantic similarity of the concepts they represent).

In one embodiment, statistical similarity approaches can be learned from data or be predefined. In one embodiment, these approaches build a statistical model of documents, and use it to estimate similarity. Examples of such approaches include latent semantic analysis, pointwise mutual information, second-order co-occurrence pointwise mutual information, generalized latent semantic analysis, incremental construction of an associative network, normalized Google distance, normalized compression distance, explicit semantic analysis, salient semantic analysis, vector generation of an explicitly-defined multidimensional semantic space, SimRank, etc.

In one embodiment, the semantic similarity between the features may be determined using semantics-based similarity algorithms, such as marker passing (markers are passed from the two target concepts carrying an amount of activation, where this activation might increase or decrease depending on the relations weight with which the concepts are connected) and the good common subsumer (GCS)-based semantic similarity measure.

Those that have a semantic meaning within a threshold degree of similarity (which may be user-selected) will be clustered together in database 104. "Clustering," as used herein, refers to the grouping of images and video frames involved in similar events.

In one embodiment, such clustering of images and video frames with similar properties are clustered together using an unsupervised machine learning algorithm, such as k-means clustering. In one embodiment, such clustering is accomplished using a density-based clustering algorithm, where clusters are defined as areas of higher density than the remainder of the data set. Objects in sparse areas—that are required to separate clusters—are usually considered to be noise and border points. Examples of a density-based clustering algorithm include density-based spatial clustering of applications with noise (DBSCAN) and the ordering points to identify the clustering structure (OPICS) algorithm.

In step 505, analyzer 101 maps each subset of the clustered images to references containing contextual information fetched from database 104, where the references are associated with images and/or video frames stored in database 104 with extracted features that are semantically similar to the extracted features of the subset of the clustered images within a threshold degree of similarity (which may be user-selected). References, as used herein, refer to the contextual information that describes the images and video frames, such as the extracted features discussed above (topics, events, sites and objects). For example, those clustered images/video frames may have images/video frames associated with the topic of a car chase, an event of a moving car and the site/object of a sunset; whereas, other images/ video frames may be associated with the topic of a car chase, an event of a moving car and the site/object of a cityscape. As a result, those images/video frames associated with the event of a moving car and the site/object of a sunset may be mapped to the reference involving the topic of a car chase, an event of a moving car and the site/object of a sunset; whereas, those images/video frames associated with the event of a moving car and the site/object of a cityscape may be mapped to the reference involving the topic of a car chase, an event of a moving car and the site/object of a cityscape.

In one embodiment, the semantic meaning of the extracted features (as well as the semantic meaning of the features associated with the stored images/video frames) is determined by analyzer 101 using natural language processing, such as via NLP engine 210. For example, the semantic meaning of the extracted features, such as topics, events as well as sites and objects, is determined by analyzer 101 using natural language processing. Similarity is based on how close is the semantic meaning of the topics, events and sites/objects associated with a subset of the cluster images to the semantic meaning of the topics, events and sites/objects of the stored images and video frames in database 104. In one embodiment, such a semantic meaning is determined using natural language processing as discussed above in connection with step 504 with the exception that the semantic meaning of all of the extracted features are utilized. Those extracted features of the subset of the cluster images that are semantically similar to the extracted features of the images and/or video frames stored in database 104 within a threshold degree of similarity (which may be user-selected) are mapped to the references that are associated with those images and/or video frames stored in database 104.

In one embodiment, such a determination of similarity of semantic features occurs at the same points of time, such as particular points during a scene in a television program or a movie.

In step 506, analyzer 101 stores the received stream of video frames in a database, such as database 104, associated with the mapped references, where the stored video frames are indexed based on the extracted features (discussed above in connection with step 502) for efficient retrieval as discussed below in connection with FIG. 3. For example, video frames from the television program of Seinfeld may be stored in database 104 and associated with the reference of a topic of choosing, the event of ordering soup and the site/object of a restaurant.

Once the GAN is trained to provide contextual information to be embedded in a received image(s) or video frame(s), analyzer 101 uses the GAN to embed such contextual information in the received image(s) or video frame(s) as discussed below in connection with FIG. 3.

Returning to FIG. 3, in conjunction with FIGS. 1-2 and 4-6, in step 302, analyzer 101 receives an image(s) or a video frame(s), such as from a video clip. In one embodiment, such an image or video frame may be a single video frame or a series of video frames, such as from a video clip, that is inserted into an electronic communication by a user to be sent to a recipient. The sender of the electronic communication may desire to ensure that the meaning of the image or video frame is understood by the recipient. For example, the sender may have inserted the image or video frame with the intention of making the recipient laugh. The sender may want to ensure that the recipient understands the humor so as to evoke laughter by the recipient. As a result, the sender of the electronic communication may input the image or video frame to analyzer 101 to embed the image or video frame with any necessary contextual information (e.g., text, sound and/or video frames) to aid in understanding the meaning of the image or video frame.

In step 303, analyzer 101 extracts the features from the received image(s) or video frame(s), including topics, events as well as the sites and objects. Such an extraction is performed in a similar manner as discussed above in connection with step 502 of FIG. 5.

In step 304, analyzer 101 identifies the image(s) and/or video frame(s) in database 104 using the GAN (see FIG. 4) associated with features with a similarity to the extracted features from the received image(s) or video frame(s) exceeding a threshold value (which may be user-selected). For example, the extracted features (e.g., topics, events as well as sites and objects) will be compared against the features associated with the stored images or video frames in database 104. When the similarity of such features exceeds a threshold value, then such images or video frames in database 104 are identified as being pertinent in extracting contextual information to be embedded in the received image(s) or video frame(s).

In one embodiment, similarity is based on how close is the semantic meaning of the extracted features of the received image(s) or video frame(s) (extracted in step 303) to the semantic meaning of the features of the stored images or video frames in database 104 (extracted in step 502). In one embodiment, such a semantic meaning is determined using natural language processing, such as via NLP engine 210. For example, analyzer 101 may determine that the event feature of a moving car is close in similarity to the event feature of a car chase since both involve the movement of a vehicle; whereas, analyzer 101 may determine that the event feature of a moving car is not close in similarity to the event feature of an explosion.

In one embodiment, semantic similarity is a metric defined over a set of terms, where the idea of distance between items is based on the likeness of their meaning or semantic content as opposed to lexicographical similarity. In one embodiment, mathematical tools are used to estimate the strength of the semantic relationship between units of language, concepts or instances, through a numerical description obtained according to the comparison of information supporting their meaning or describing their nature.

In one embodiment, computationally, semantic similarity can be estimated by defining a topological similarity, by using ontologies to define the distance between terms/concepts. For example, a naive metric for the comparison of concepts ordered in a partially ordered set and represented as nodes of a directed acyclic graph (e.g., a taxonomy), would be the shortest-path linking the two concept nodes. Based on text analyses, semantic relatedness between units of language (e.g., words) can also be estimated using statistical means, such as a vector space model to correlate words and textual contexts from a suitable text corpus. The evaluation of the proposed semantic similarity/relatedness measures are evaluated through two main ways. The former is based on the use of datasets designed by experts and composed of word pairs with semantic similarity/relatedness degree estimation. The second way is based on the integration of the measures inside specific applications, such as natural language processing.

In one embodiment, the approaches to calculate topological similarity between ontological concepts include edge-based (use the edges and their types as the data source) and node-based (main data sources are the nodes and their properties). Other measures calculate the similarity between ontological instances, such as pairwise (measure functional similarity between two instances by combining the semantic similarities of the concepts they represent) and groupwise (calculate the similarity directly and not combining the semantic similarity of the concepts they represent).

In one embodiment, statistical similarity approaches can be learned from data or be predefined. In one embodiment, these approaches build a statistical model of documents, and use it to estimate similarity. Examples of such approaches include latent semantic analysis, pointwise mutual information, second-order co-occurrence pointwise mutual information, generalized latent semantic analysis, incremental construction of an associative network, normalized Google distance, normalized compression distance, explicit semantic analysis, salient semantic analysis, vector generation of an explicitly-defined multidimensional semantic space, SimRank, etc.

In one embodiment, the semantic similarity between the features may be determined using semantics-based similarity algorithms, such as marker passing (markers are passed from the two target concepts carrying an amount of activation, where this activation might increase or decrease depending on the relations weight with which the concepts are connected) and the good common subsumer (GCS)-based semantic similarity measure.

In step 305, analyzer 101 extracts the references containing the contextual information associated with the identified image(s) and/or video frame(s) from database 104 using the GAN. As previously discussed, the images and video frames stored in database 104 are associated with "references" which includes contextual information (e.g., text, sound and/or video frames) that are based on the features extracted from such images and video frames. Such contextual information is helpful in understanding the meaning of the received image(s) or video frame(s) in step 302. For example, a sender of an electronic communication may have inserted an image from a scene of the television program of Seinfeld to evoke laughter from the recipient. However, the recipient may have never seen this television program, and as a result, may not understand the intended humor. By identifying image(s) and video frame(s) in database 104 with a similarity of features as the features extracted from the image of the scene of the television program of Seinfeld that exceeds a threshold value, the references of such identified image(s) and video frame(s) may be useful in understanding of the meaning of the image inserted into the electronic communication. For example, the identified image(s) and video frame(s) may correspond to video frames encompassing the image inserted into the electronic communication to provide a background to the inserted image. Such references associated with such identified video frames may include the sound and video frames as well as text associated with the dialogue in these video frames.

In one embodiment, such received image(s) or video frame(s) are augmented with the extracted references at regular times (e.g., every 10 seconds). In one embodiment, such augmentation is performed by intersecting the images/video frames at a regular time (e.g., every 10 seconds) with GAN generated images. In this manner, the received image(s) or video frame(s) are tagged to inherit the characteristics of the related image(s) or video frame(s) stored in database 104.

In one embodiment, the GAN network (see FIG. 4) utilizes an Ising model to determine which references associated with the identified image(s) and/or video frame(s) to be extracted.

In one embodiment, the Ising model uses ferromagnetism models such that as each gate receives enough magnetism, the gate will open. Over time, as traits are learned by the Ising model, the model will point back to neighboring cells to influence the magnetic field strength. If enough of the atomic spins (modeled by an electromagnetic equation) align, the gate will open causing a phase transition. Each snapshot of the ferromagnetism patterns will produce a magnetic vector that is input into a magnetic vector to a keyword and concept model.

In one embodiment, the spins are arranged in an N-dimensional lattice, the interaction energy of which is described by the Hamiltonian:

$$H = \sum_{ij} w_{ij} x_i x_j - \mu \sum_i h_i x_i$$

In one embodiment, a second Ising model learns relationships between the keywords and concepts within the sound or video. The input is the sound magnetism and keyword and concept magnetism.

In one embodiment, the Ising models are trained with supervised learning.

In step 306, analyzer 101 augments the received image(s) or video frame(s) by embedding the extracted references containing the contextual information (e.g., text, sound and/or video frames). For example, as discussed above, the received image(s) or video frame(s) may be augmented with the extracted references, which contain additional video frames, along with the associated sound and text (dialogue in these video frames). Such contextual information provides the individual with context to provide a greater understanding of the meaning of the received image(s) or video frame(s).

As a result of the foregoing, embodiments of the present disclosure provide a means for utilizing a generative adversarial network to provide contextual information, including text, sound and/or video frames, to be embedded in an image(s) or video frame(s) to improve understanding of the image(s) or video frame(s).

Furthermore, the present disclosure improves the technology or technical field involving editing tools, such as video editing tools. As discussed above, at times, when individuals exchange communications, such as electronic mail, the sender may include images or video clips in the message with the intention of making the recipient laugh. However, the recipient may not understand the intended meaning of the inserted image or video clip, and therefore, not be able to understand the humor. For example, the sender may insert a short video clip of a movie in an electronic message to the recipient with the intention of making the recipient laugh. Using editing tools, such as video editing tools, the sender may insert a tagline, text or phrase next to the video clip with an intended humorous meaning. However, understanding the intended humor may depend on having knowledge of a particular movie or the features of a product to which the video clip and inserted tagline, text or phrase pertains. If the recipient does not possess knowledge of such a movie or features of the product, then the recipient may not understand the intended humor. Currently, such editing tools do not possess the capability or intelligence to automatically embed contextual information in an image, video clip or video stream that would be necessary for the recipient to have in order to understand the intended humor.

Embodiments of the present disclosure improve such technology by embedding contextual information in an image or video frames. A generative adversarial network is trained to provide contextual information to be embedded in the image or the video frames, where the contextual information includes text, sound and/or video frames that provides context to the image or the video frames. After training the generative adversarial network, an image or video frames are received to be embedded with contextual information if necessary. Contextual information, as used herein, refers to information, including text, sound and/or video frames, that provides context to an image, video clip or video stream. Such context enables understanding of the image, video clip or video stream. Features are then extracted from the received image or video frames, where the extracted features include topics, events as well as sites and objects. One or more images and/or one or more video frames are identified in a database using the generative adversarial network that are associated with features with a similarity to the extracted features of the received image or video frames that exceeds a threshold value. Such identified images and/or video frames are associated with "references" containing contextual information. As a result, references containing contextual information associated with the identified one or more images and/or one or more video frames are extracted from the database. The received image or video frames are then augmented with the extracted references to provide context to the received image and/or video frames thereby improving understanding of the image and/or video frames. Additionally, in this manner, there is an improvement in the technical field involving video editing tools.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for embedding contextual information in an image or video frames, the method comprising:

training a generative adversarial network to provide contextual information to be embedded in said image or said video frames, wherein said contextual information comprises text, sound and/or video frames that provides context to said image or said video frames;

receiving said image or said video frames;

extracting features from said received image or said received video frames, wherein said extracted features comprise topics, events as well as sites and objects;

identifying one or more images and/or one or more video frames in a database using said generative adversarial network associated with features with a similarity to said extracted features from said received image or said received video frames that exceeds a threshold value;

extracting references containing contextual information associated with said identified one or more images and/or one or more video frames from said database using said generative adversarial network, wherein said references contain said contextual information to assist a user in understanding a meaning of said received image or said received video frames; and augmenting said image or said video frames with said extracted references.

2. The method as recited in claim 1, wherein said training of said generative adversarial network comprises:
   receiving a stream of video frames; and
   extracting features from said stream of video frames, wherein said extracted features comprise topics, events as well as sites and objects.

3. The method as recited in claim 2, wherein said training of said generative adversarial network further comprises:
   separating different events through a sequence of images of said stream of video frames.

4. The method as recited in claim 3, wherein said training of said generative adversarial network further comprises:
   clustering images of said stream of video frames along with images of video frames stored in said database that are each associated with events within a threshold degree of similarity.

5. The method as recited in claim 4, wherein said training of said generative adversarial network further comprises:
   mapping each subset of said clustered images to references containing contextual information fetched from said database, wherein said references containing contextual information fetched from said database are associated with images and/or video frames stored in said database with extracted features that are semantically similar to extracted features of said subset of said clustered images within a threshold degree of similarity.

6. The method as recited in claim 5, wherein said training of said generative adversarial network further comprises:
   storing said received stream of video frames in said database associated with said mapped references, wherein said stored stream of video frames are indexed based on said extracted features.

7. The method as recited in claim 1 further comprising:
   utilizing an Ising model to determine which references associated with said identified one or more images and/or one or more video frames in said database are to be extracted.

8. A computer program product for embedding contextual information in an image or video frames, the computer program product comprising one or more computer readable storage mediums having program code embodied therewith, the program code comprising programming instructions for:
   training a generative adversarial network to provide contextual information to be embedded in said image or said video frames, wherein said contextual information comprises text, sound and/or video frames that provides context to said image or said video frames;
   receiving said image or said video frames;
   extracting features from said received image or said received video frames, wherein said extracted features comprise topics, events as well as sites and objects;
   identifying one or more images and/or one or more video frames in a database using said generative adversarial network associated with features with a similarity to said extracted features from said received image or said received video frames that exceeds a threshold value;
   extracting references containing contextual information associated with said identified one or more images and/or one or more video frames from said database using said generative adversarial network, wherein said references contain said contextual information to assist a user in understanding a meaning of said received image or said received video frames; and
   augmenting said image or said video frames with said extracted references.

9. The computer program product as recited in claim 8, wherein said training of said generative adversarial network comprises:
   receiving a stream of video frames; and
   extracting features from said stream of video frames, wherein said extracted features comprise topics, events as well as sites and objects.

10. The computer program product as recited in claim 9, wherein said training of said generative adversarial network further comprises:
   separating different events through a sequence of images of said stream of video frames.

11. The computer program product as recited in claim 10, wherein said training of said generative adversarial network further comprises:
   clustering images of said stream of video frames along with images of video frames stored in said database that are each associated with events within a threshold degree of similarity.

12. The computer program product as recited in claim 11, wherein said training of said generative adversarial network further comprises:
   mapping each subset of said clustered images to references containing contextual information fetched from said database, wherein said references containing contextual information fetched from said database are associated with images and/or video frames stored in said database with extracted features that are semantically similar to extracted features of said subset of said clustered images within a threshold degree of similarity.

13. The computer program product as recited in claim 12, wherein said training of said generative adversarial network further comprises:
   storing said received stream of video frames in said database associated with said mapped references, wherein said stored stream of video frames are indexed based on said extracted features.

14. The computer program product as recited in claim 8, wherein the program code further comprises the programming instructions for:
   utilizing an Ising model to determine which references associated with said identified one or more images and/or one or more video frames in said database are to be extracted.

15. A system, comprising:
   a memory for storing a computer program for embedding contextual information in an image or video frames; and
   a processor connected to said memory, wherein said processor is configured to execute program instructions of the computer program comprising:
     training a generative adversarial network to provide contextual information to be embedded in said image or said video frames, wherein said contextual information comprises text, sound and/or video frames that provides context to said image or said video frames;
     receiving said image or said video frames;
     extracting features from said received image or said received video frames, wherein said extracted features comprise topics, events as well as sites and objects;
     identifying one or more images and/or one or more video frames in a database using said generative adversarial network associated with features with a similarity to said extracted features from said received image or said received video frames that exceeds a threshold value;

extracting references containing contextual information associated with said identified one or more images and/or one or more video frames from said database using said generative adversarial network, wherein said references contain said contextual information to assist a user in understanding a meaning of said received image or said received video frames; and augmenting said image or said video frames with said extracted references.

16. The system as recited in claim 15, wherein said training of said generative adversarial network comprises:

receiving a stream of video frames; and extracting features from said stream of video frames, wherein said extracted features comprise topics, events as well as sites and objects.

17. The system as recited in claim 16, wherein said training of said generative adversarial network further comprises:

separating different events through a sequence of images of said stream of video frames.

18. The system as recited in claim 17, wherein said training of said generative adversarial network further comprises:

clustering images of said stream of video frames along with images of video frames stored in said database that are each associated with events within a threshold degree of similarity.

19. The system as recited in claim 18, wherein said training of said generative adversarial network further comprises:

mapping each subset of said clustered images to references containing contextual information fetched from said database, wherein said references containing contextual information fetched from said database are associated with images and/or video frames stored in said database with extracted features that are semantically similar to extracted features of said subset of said clustered images within a threshold degree of similarity.

20. The system as recited in claim 19, wherein said training of said generative adversarial network further comprises:

storing said received stream of video frames in said database associated with said mapped references, wherein said stored stream of video frames are indexed based on said extracted features.

* * * * *